United States Patent
Li et al.

(10) Patent No.: US 12,367,099 B2
(45) Date of Patent: Jul. 22, 2025

(54) ERROR CORRECTION METHOD AND APPARATUS

(71) Applicant: HUAWEI TECHNOLOGIES CO., LTD., Guangdong (CN)

(72) Inventors: Yuwei Li, Shenzhen (CN); Xu Zhang, Hangzhou (CN); Wei Li, Shenzhen (CN); Kun Zhang, Chengdu (CN); Wen Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/327,374

(22) Filed: Jun. 1, 2023

(65) Prior Publication Data

US 2023/0325276 A1 Oct. 12, 2023

Related U.S. Application Data

(63) Continuation of application No. PCT/CN2021/123919, filed on Oct. 14, 2021.

(30) Foreign Application Priority Data

Dec. 3, 2020 (CN) .......................... 202011406212.1

(51) Int. Cl.
*G06F 11/10* (2006.01)
*G06F 11/07* (2006.01)

(52) U.S. Cl.
CPC ...... *G06F 11/1068* (2013.01); *G06F 11/0787* (2013.01); *G06F 11/0793* (2013.01)

(58) Field of Classification Search
CPC ............ G06F 11/1068; G06F 11/0787; G06F 11/0793; G06F 11/1048; G06F 11/1072; G06F 11/085; G06F 11/1016
(Continued)

(56) References Cited

U.S. PATENT DOCUMENTS

| | | | | |
|---|---|---|---|---|
| 2001/0056567 | A1* | 12/2001 | Sakurai | G06F 11/106 |
| | | | | 714/E11.052 |
| 2013/0145227 | A1* | 6/2013 | Palaniappan | G06F 11/10 |
| | | | | 714/E11.032 |

(Continued)

FOREIGN PATENT DOCUMENTS

| | | |
|---|---|---|
| CN | 102237139 A | 11/2011 |
| CN | 103019883 A | 4/2013 |

(Continued)

*Primary Examiner* — James C Kerveros
(74) *Attorney, Agent, or Firm* — Fish & Richardson P.C.

(57) ABSTRACT

Example error correction methods and apparatus are described. In one example method, a register controller detects an error existing in a memory, and after detecting an uncorrected error (UCE), obtains a memory address in which the UCE occurs. The register controller reads raw data from a location indicated by the memory address, stores preset first data in the location indicated by the memory address, and reads second data from the location after storing the first data in the location. The register controller compares the first data with the second data to determine a first failure location in the location, determines raw data stored in the first failure location from the raw data in the location, and performs error correction on the raw data stored in the first failure location.

20 Claims, 5 Drawing Sheets

(58) Field of Classification Search
USPC .......................................................... 714/764
See application file for complete search history.

(56)      References Cited

U.S. PATENT DOCUMENTS

| | | | |
|---|---|---|---|
| 2013/0179751 A1* | 7/2013 | Linstadt .................. | G06F 11/10 |
| | | | 714/763 |
| 2014/0047296 A1* | 2/2014 | Motabar ............. | G06F 11/1048 |
| | | | 714/E11.034 |
| 2015/0046772 A1* | 2/2015 | Bennett ............... | G06F 11/1016 |
| | | | 714/768 |
| 2018/0253354 A1* | 9/2018 | Nishida ............... | G06F 11/1076 |
| 2020/0210276 A1* | 7/2020 | Sullivan ............. | G06F 11/1654 |

FOREIGN PATENT DOCUMENTS

| | | |
|---|---|---|
| CN | 110444243 A | 11/2019 |
| JP | 2000323994 A | 11/2000 |

\* cited by examiner

ERROR CORRECTION METHOD AND APPARATUS

CROSS-REFERENCE TO RELATED APPLICATIONS

This application is a continuation of International Application No. PCT/CN2021/123919, filed on Oct. 14, 2021, which claims priority to Chinese Patent Application No. 202011406212.1, filed on Dec. 3, 2020. The disclosures of the aforementioned applications are hereby incorporated by reference in their entireties.

TECHNICAL FIELD

This application relates to the field of communication technologies, and in particular, to an error correction method and apparatus.

BACKGROUND

RAS (reliability, availability, serviceability) of a memory is reliability, availability, and serviceability of the memory. To ensure the RAS of the memory, a plurality of memory error correction methods are proposed currently, for example, adaptive double device data correction (ADDDC), single-device data correction (SDDC), memory mirror (memory mirror), rank sparing (rank sparing), and system management interrupt (SMI).

Errors occurring in a memory may be classified into two types. One type is a corrected error (CE). To be specific, this type of error may be corrected by using an error correction algorithm. The CE usually occurs in a memory die of the memory (the memory die is a unit of the memory), and a data size of the error that occurs is usually one bit. The other type is an uncorrected error (UCE), that is, an error that cannot be corrected by using an error correction algorithm. This type of error usually occurs in a plurality of memory dice of the memory, and a data size of the occurring error is a plurality of bits. For the former, the plurality of currently proposed memory error correction methods can all perform error correction. For the latter, accurate positioning cannot be implemented, and consequently error correction cannot be performed.

SUMMARY

This application provides an error correction method and apparatus, to position a location in which a UCE occurs in a memory, and perform error correction on the UCE.

According to a first aspect, an embodiment of this application provides an error correction method. The method is performed by a register controller. The register controller may detect an error in a memory, and after detecting a UCE, may obtain a memory address in which the UCE occurs. After obtaining the memory address, the register controller may read raw data from a location indicated by the memory address, to be specific, data stored in the location indicated by the memory address, then store preset first data in the location indicated by the memory address, and read second data from the location after the first data is stored in the location. The register controller may compare the first data with the second data to determine a first failure location in the location. The register controller may determine raw data stored in the first failure location from the raw data in the location, and perform error correction on the raw data stored in the first failure location.

Based on the foregoing method, the register controller can accurately position a failure location in which a UCE occurs by performing data write and read operations, to perform error correction on raw data stored in the failure location. Such a manner of positioning a failure location is more efficient, and can reduce UCEs by performing error correction on the raw data stored in the failure location, and improve stability of the memory.

In a possible implementation, the register controller can further flip the first data, store the flipped first data in a location indicated by the memory address, and after storing the flipped first data in the location, read third data from the location. Then, the flipped first data is compared with the third data to determine a second failure location in the location. The register controller may perform error correction on raw data stored in the second failure location.

Based on the foregoing method, the second failure location that is different from the first failure location can be determined by flipping the first data and performing data write and read, to avoid a case in which the first failure location has an omission. All failure locations in the location are positioned, ensuring integrity and accuracy of failure location positioning.

In a possible implementation, when the register controller performs error correction on the raw data stored in the first failure location, the register controller may flip data in at least one bit in the first failure location in the raw data. Each time the data is flipped, the raw data is converted into one piece of candidate data. The register controller may perform error correction on the candidate data by using an error correction algorithm to determine whether the candidate data is correct. If the candidate data is correct or correct data may be obtained by using the error correction algorithm, the flipping is stopped. Otherwise, the data in the at least one bit in the first failure location in the raw data continues to be flipped until correct data can be obtained. The register controller may also flip target data (the target data is data that is in the first failure location and that is located in at least one bit on a target memory die) in the raw data. Each time the target data is flipped, the raw data is converted into one piece of candidate data. The register controller may perform error correction on the candidate data by using an error correction algorithm. If error correction of the candidate data succeeds, data corrected by using the error correction algorithm is correct data. Otherwise, the raw data that is in the first failure location and that is located in the at least one bit on the target die continues to be flipped, to obtain another piece of candidate data. Then, error correction is performed on the candidate data by using the error correction algorithm. The foregoing operations are performed circularly until correct data can be obtained by using the error correction algorithm.

A manner in which the register controller performs error correction on the raw data stored in the second failure location is similar to a manner in which the register controller performs error correction on the raw data stored in the first failure location. For details, refer to the foregoing content.

After determining the first failure location and the second failure location, the register controller may also simultaneously perform error correction on the raw data stored in the first failure location and the second failure location. Specifically, the register controller may flip data in at least one bit in the failure location in the raw data. The failure location includes the first failure location and the second failure location. Each time the data is flipped, the raw data is converted into one piece of candidate data. The register controller may perform error correction on the candidate data by using an error correction algorithm to determine whether the candidate data is correct. If the candidate data is correct or correct data can be obtained by using the error correction algorithm, the flipping is stopped. Otherwise, the data in the at least one bit in the failure location in the raw data continues to be flipped until correct data can be obtained. The register controller may also flip target data (the target data is data that is in a failure location and that is located in at least one bit on a target die) in the raw data. Each time the target data is flipped, the raw data is converted into one piece of candidate data. The register controller may perform error correction on the candidate data by using an error correction algorithm. If error correction of the candidate data succeeds, data corrected by using the error correction algorithm is correct data. Otherwise, the raw data that is in the failure location and that is located in the at least one bit on the target die continues to be flipped, to obtain another piece of candidate data. Then, error correction is performed on the candidate data by using the error correction algorithm. The foregoing operations are performed circularly until correct data can be obtained by using the error correction algorithm.

Based on the foregoing method, the register controller can implement data error correction by flipping raw data. Such a manner is simple and efficient, and can improve efficiency of data error correction.

In a possible implementation, when comparing the first data with the second data to determine the first failure location in the location, the register controller may determine inconsistent first sub-data in the first data and the second data, where a location in which the first sub-data is stored is the first failure location.

Based on the foregoing method, the register controller may determine, by simply comparing the first data with the second data, the failure location in the location indicated by the memory address. Such a manner of positioning a failure location is quick, and effectively improves efficiency of positioning the failure location.

In a possible implementation, when comparing the flipped first data with the third data to determine the second failure location in the location, the register controller may determine inconsistent second sub-data in the flipped first data and the third data, where a location in which the second sub-data is stored is the second failure location.

Based on the foregoing method, the register controller may determine the second failure location other than the first failure location in the location indicated by the memory address by simply comparing the flipped first data with the third data. Such a manner of positioning a failure location is quick.

In a possible implementation, when storing preset first data in the location indicated by the memory address, the register controller may directly store the first data in the location indicated by the memory address without generating redundancy code of the first data.

Based on the foregoing method, a failure location may also exist in a location in which redundancy code is stored in the memory. The first data is directly stored in the location, so that the failure location that may exist in the location in which the redundancy code is stored may be positioned subsequently, thereby ensuring accuracy of positioning the failure location.

According to a second aspect, an embodiment of the present invention provides an error correction apparatus. The error correction apparatus has a function of implementing behavior of the register controller in the foregoing method example. The function may be implemented by hardware, or may be implemented by executing corresponding software by hardware. The hardware or software includes one or more modules corresponding to the foregoing functions.

According to a third aspect, an embodiment of the present invention provides an apparatus. The apparatus includes a memory and a processor. The processor is configured to support the apparatus in performing a corresponding function in the foregoing method. The memory is coupled to the processor, and the memory stores program instructions and data that are necessary for the apparatus.

According to a fourth aspect, an embodiment of this application further provides a computer-readable storage medium. The storage medium stores a software program. When read and executed by a processor, the software program can implement the method provided in the first aspect and any one of designs of the first aspect.

According to a fifth aspect, this application further provides a computer chip. The chip is connected to a memory. The chip is configured to read and execute a software program stored in the memory, to perform the method provided in the first aspect and any one of designs of the first aspect.

DESCRIPTION OF EMBODIMENTS

Figure 1:
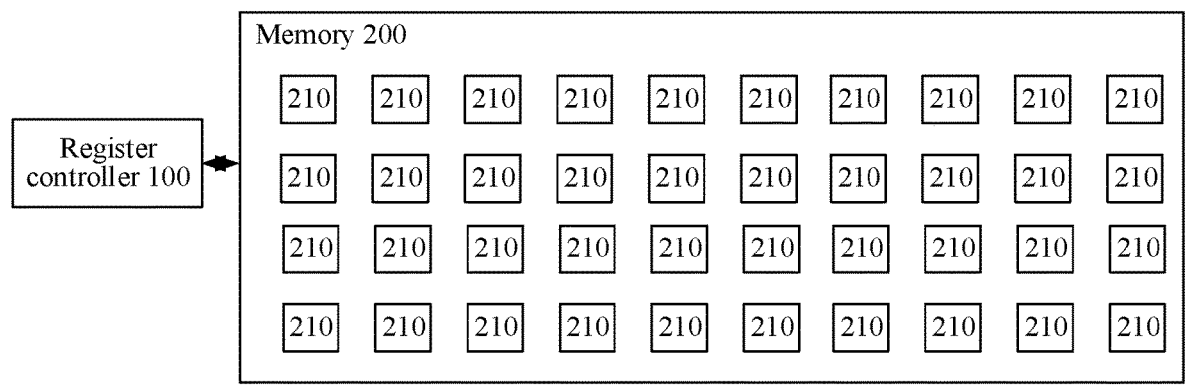
FIG. 1 is a schematic diagram of an architecture of a system according to this application.

FIG. 1 is a diagram of an architecture of a system to which an embodiment of this application is applicable. The system includes a register controller 100 and a memory 200.

The register controller 100 can perform an error correction method provided in embodiments of this application. The register controller 100 can detect a UCE that occurs in the memory 200, and obtain a memory address in which the UCE occurs. When performing error correction on the UCE, the register controller 100 may position a failure location in the memory address by performing a data write operation and a data read operation, and perform error correction on raw data stored in the failure location.

A specific type of the register controller 100 is not limited in this embodiment of this application. For example, the register controller 100 may be a double data rate controller (DDRC), or may be a control module in a processor. Any module that can perform the error correction method provided in embodiments of this application is applicable to embodiments of this application.

The memory 200 is configured to store data. The memory 200 includes a plurality of memory dice 210. The memory die 210 may also be referred to as a memory chip. The memory die 210 is usually a dynamic random access memory (DRAM). The memory dice 210 are usually allowed to store a same size of data, and the memory die 210 is usually allowed to store data with a size of 4 to 16 megabytes (Gb).

In this embodiment of this application, after detecting that the UCE exists in the memory 200, the register controller 100 may obtain the memory address in which the UCE occurs; after storing preset data (corresponding to first data in a subsequent embodiment) in a location indicated by the memory address, read data from the location, and determine a failure location in the location by comparing written data with read data, where the failure location is a location in which the UCE occurs; and perform error correction on raw data stored in the failure location. According to the error correction method provided in embodiments of this application, a location in which a UCE occurs can be quickly positioned, and error correction can be performed, thereby reducing UCEs existing in the memory 200, and improving stability of the memory 200.

Before the error correction method provided in embodiments of this application is described, a data write process and a data read process in a normal case are first briefly described.

(1) Data Write

Figure 2A:
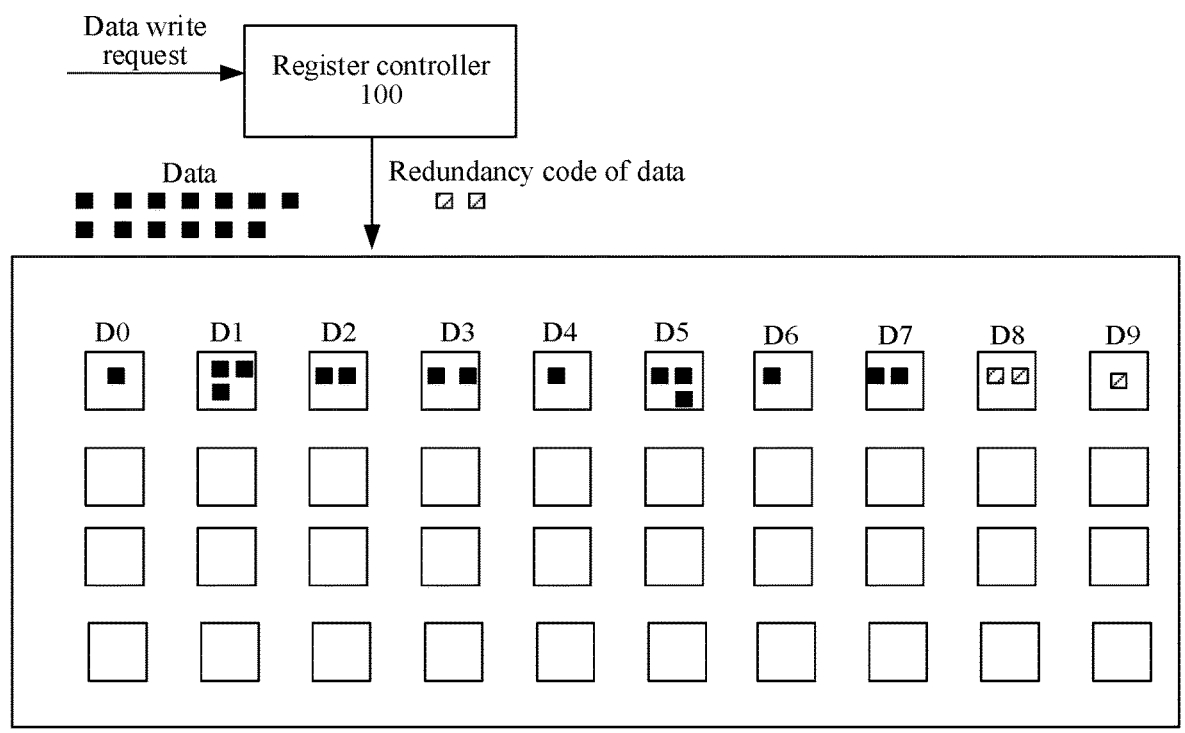
FIG. 2A is a schematic diagram of a data write method according to this application.

Refer to FIG. 2A. The register controller 100 receives a data write request (the register controller 100 may receive the data write request from a processor). The data write request includes to-be-written data and a memory address to which the to-be-written data needs to be written. After obtaining the to-be-written data, the register controller 100 first generates redundancy code of the to-be-written data. The redundancy code can be used to perform error correction on the to-be-written data when the to-be-written data needs to be read subsequently, to ensure that correct to-be-written data can be read subsequently.

After the redundancy code of the to-be-written data is generated, the to-be-written data and the redundancy code of the to-be-written data are written to a location indicated by the memory address carried in the data write request. The location indicated by the memory address may be distributed in one or more memory dice 210 of the memory 200. In other words, the to-be-written data and the redundancy code of the to-be-written data may be distributed in the one or more memory dice 210. As shown in FIG. 2A, the to-be-written data may be distributed in memory dice D0 to D7, and the redundancy code of the to-be-written data may be distributed in memory dice D8 and D9.

(2) Data Read

Figure 2B:
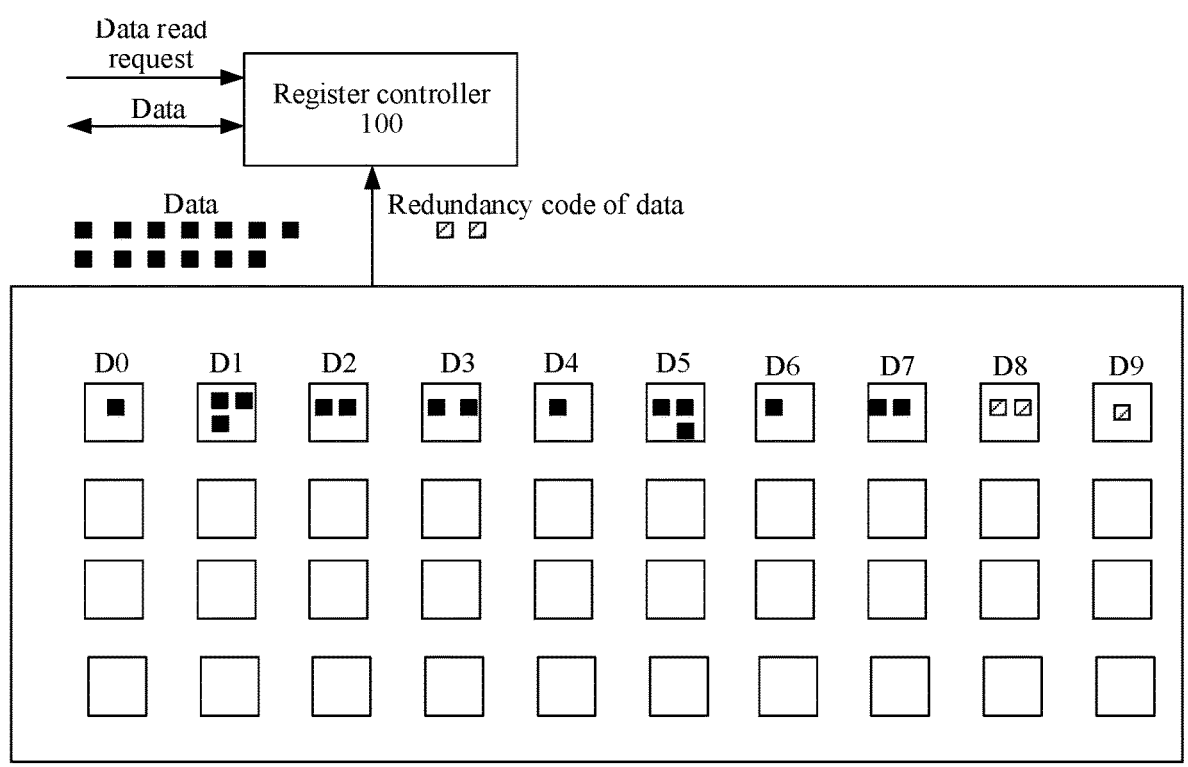
FIG. 2B is a schematic diagram of a data read method according to this application.

Refer to FIG. 2B. The register controller 100 receives a data read request (the register controller 100 may receive the data read request from a processor). The data read request includes a memory address of data. The register controller 100 reads the data and redundancy code of the data from a location indicated by the memory address.

The register controller 100 performs error detection on the read data by using the redundancy code of the data. If no error occurs in the data, the data is directly fed back; or if an error occurs in the data, error correction is performed on the data by using the redundancy code of the data through an error correction algorithm, and after the error correction is performed on the data, the corrected data is fed back.

Figure 3:
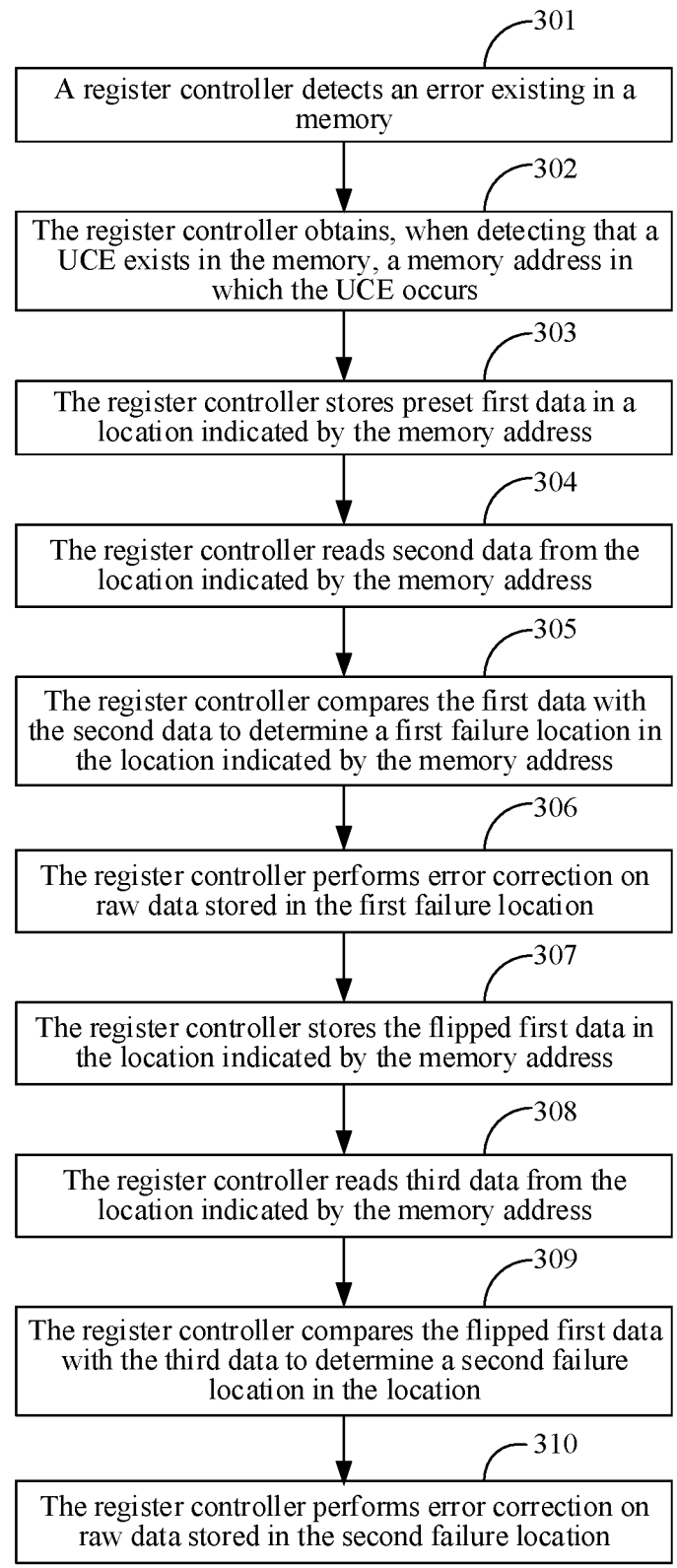
FIG. 3 is a schematic diagram of an error correction method according to this application.

The following describes an error correction method according to an embodiment of this application with reference to FIG. 3. Refer to FIG. 3. The method includes the following steps.

Step 301: A register controller 100 detects an error existing in a memory 200. The register controller 100 may determine, by performing error detection and error correction on data stored in the memory 200, whether an error exists in the memory 200.

There are many scenarios in which the register controller 100 detects an error existing in the memory 200. For example, when a processor needs to read data in the memory 200, the register controller 100 may perform error detection on the data when reading the data from the memory 200, to determine whether an error occurs in the data. If an error occurs in the data, it indicates that an error exists in a location in which the data is stored in the memory 200; otherwise, no error exists in a location in which the data is stored in the memory 200. For another example, the register controller 100 may periodically perform error detection on data in the memory 200, to determine whether an error exists in a location in which data is stored in the memory 200. For another example, the register controller 100 may also perform, under an error detection instruction sent by a processor, error detection on data stored in the memory 200.

This embodiment of this application does not limit manners in which the register controller 100 performs error detection on data stored in the memory 200. The following describes one of the manners. When reading data from the memory 200, the register controller 100 may read the data and redundancy code of the data together, recalculate new redundancy code based on the data, and compare the new redundancy code with the redundancy code read from the memory 200. If the new redundancy code is entirely consistent with the read redundancy code, it indicates that the data is correct, and there is no error in the memory 200 (in other words, there is no error in a location in which the data is stored in the memory 200). If the new redundancy code is inconsistent with the read redundancy code, it indicates that an error occurs in the data, and there is an error in the memory 200 (in other words, there is an error in a location in which the data and the redundancy code of the data are stored in the memory 200).

After finding that an error occurs in the data, the register controller 100 may perform error correction on the data. For example, the register controller 100 may perform error correction on the data by using redundancy code through an error correction algorithm.

If the register controller 100 can perform error correction on the data by using the redundancy code through the error correction algorithm, to be specific, an output result of the error correction algorithm indicates corrected data, it indicates that an error existing in the memory 200 is a corrected error (CE). If error correction cannot be performed on the data by using the error correction algorithm and the redundancy code, to be specific, an output result of the error correction algorithm indicates that error correction cannot be performed, it indicates that an error existing in the memory 200 is an uncorrected error (UCE).

Usually, a size of data that is read by the register controller 100 from the memory 200 is in a unit of a specific value. In other words, a size of data that is read by the register controller 100 from the memory 200 at a time other than redundancy code is fixed and is equal to the specific value. The specific value may be equal to a size of a cache line (cache line), such as, 64 bytes (Bytes). The size of the data indicated by the specific value herein does not include the redundancy code of the data. When reading data of a size of the specific value from the memory 200 at a time, the register controller 100 may further read redundancy code of the data from the memory 200. A size of the redundancy code may be 16 bytes. In other words, a total size of the data that is read by the register controller 100 from the memory 200 is equal to a total size of the redundancy code and the data. For example, a total size of the data that is read by the register controller 100 from the memory 200 at a time is equal to 80 bytes (a sum of 64 bytes and 16 bytes).

Step 302: The register controller 100 obtains, when detecting that a UCE exists in the memory 200, a memory address in which the UCE occurs. The memory address is a memory address of erroneous data (the erroneous data includes data and redundancy code of the data). A size of storage space indicated by the memory address is equal to a sum of a specific value and a size of redundancy code, such as, 84 bytes.

One reason why the UCE occurs is that hardware in a location (for example, a transistor or a capacitor in the location) of one or more bits in the memory die 210 is damaged, causing an error in data in the one or more bits (this failure is caused by the hardware and belongs to a hard failure). Herein, the one or more bits is a failure location, and performing error correction on the UCE may be implemented as long as error correction is performed on data in the one or more bits. However, the memory address indicates only a large bit range in which the UCE occurs, and the memory address cannot indicate which specific bit in the memory die 210 is invalid. In other words, with the memory address obtained in step 302, the failure location cannot be accurately positioned.

In order to implement error correction on the UCE, a failure location needs to be positioned first. The failure location includes a first failure location (for a manner of positioning the first failure location and performing error correction on data in the first failure location, refer to steps 303 to 306), and optionally, may further include a second failure location (for a manner of positioning the second failure location and performing error correction on data in the second failure location, refer to steps 307 to 310).

Step 303: The register controller 100 stores preset first data in a location indicated by the memory address.

Before step 303 is performed, the register controller 100 may further first read raw data (the raw data includes data and redundancy code of the data) stored in the location indicated by the memory address, store the read raw data locally, and then write the first data to the location indicated by the memory address.

It can be learned from the foregoing description of the UCE that the UCE may be caused because hardware is damaged. In other words, for each memory die 210 that stores data or redundancy code, there is a possibility that hardware is damaged. If step 303 is performed in a data write manner shown in FIG. 2A, because redundancy code of the first data needs to be generated first and then the first data and the redundancy code of the first data are stored in a location indicated by the memory address (in this case, a data length of the first data and the redundancy code of the first data is the same as a quantity of bits in the location indicated by the memory address), an error occurs in the redundancy code when the memory die 210 in which the redundancy code is located has a failure location. However, when data is read subsequently from the location indicated by the memory address, because the redundancy code is only used for data error correction, finally read data does not include the redundancy code. As a result, the failure location in the memory die 210 in which the redundancy code is located cannot be positioned.

To avoid this case, the failure location is positioned as accurately as possible. When performing step 303, the register controller 100 may directly store the first data in the location indicated by the memory address without generating the redundancy code of the first data. In other words, a data length of the first data is the same as a quantity of bits in the location indicated by the memory address.

A specific value of the first data is not limited herein. The specific value of the first data may be all—0 data, or may be all—1 data, or may be data formed by 0 and 1.

Step 304: The register controller 100 reads second data from the location indicated by the memory address.

When the first data is stored in the location indicated by the memory address, because the location indicated by the memory address has a failure location, data stored in the failure location in the first data changes. When the register controller 100 reads data from the location indicated by the memory address, the read data is no longer the first data, but the second data that has some difference from the first data.

It should be noted that, because no redundancy code of the first data is generated when the first data is written, when the register controller 100 reads data from the location indicated by the memory address, there is no need to perform error correction on the read data by using the redundancy code through the error correction algorithm. In other words, the second data that is read by the register controller 100 from the location indicated by the memory address is data on which error correction is not performed.

Step 305: The register controller 100 compares the first data with the second data to determine a first failure location in the location indicated by the memory address.

After obtaining the first data and the second data, the register controller 100 may compare the first data with the second data to determine inconsistent data in the first data and the second data. For ease of description, the inconsistent data may be referred to as first sub-data. A location in which the first sub-data is stored is the first failure location.

For example, the first data is 0000000000000000, and the second data is 0100001000100001. In this case, the first sub-data is data in bits 2, 7, 11, and 16 in the first data and the second data. The location in which the first sub-data is stored is a location in which data in bits 2, 7, 11, and 16 in the first data and the second data is stored, to be specific, the first failure location.

Step 306: The register controller 100 performs error correction on raw data stored in the first failure location.

Because the UCE is distributed on a plurality of memory dice 210, it indicates that the first failure location positioned in step 305 is distributed on the plurality of memory dice 210.

After determining the first failure location, the register controller 100 may determine, from raw data stored in the location indicated by the memory address (the raw data is locally read and stored by the register controller 100 before step 303 is performed), data stored in the first failure location. Then, the register controller 100 may perform error correction on the data in the first failure location.

Because hardware in a location of one or more bits in the memory die 210 is damaged, data 0 may be changed to data 1, data 1 may be changed to data 0, or stored data may be fixed data. For example, no matter whether 0 or 1 needs to be stored in the location, finally written data is changed to 0. For another example, no matter whether 0 or 1 needs to be stored in the location, finally written data is changed to 1. When error correction is performed on the raw data stored in the first failure location, data in at least one bit of the first failure location may be flipped, to implement data error correction. The following describes two error correction manners provided in embodiments of this application.

Manner 1: Perform flipping for a plurality of times until correct data is obtained.

The register controller 100 may perform error correction in only a data flipping manner. The register controller 100 may flip data of some or all bits in the first failure location in the raw data, change 0 to 1, and change 1 to 0, to obtain all possible data in the first failure location. For ease of description, each piece of possible data and data in a location other than the first failure location in the memory address may form one piece of candidate data. In other words, the register controller 100 flips data of some or all bits in the first failure location in the raw data once, to convert the raw data into one piece of candidate data.

If the first failure location includes N bits, all possible stored data stored in the first failure location has 2N forms, to be specific, there are 2N pieces of candidate data. For example, if the first failure location includes two bits, there are four pieces of possible stored data in the first failure location, which are respectively 00, 11, 10, and 01. Each piece of possible stored data and raw data stored in a location other than the first failure location in the memory address form one piece of candidate data, and four pieces of candidate data are generated.

Because the raw data includes data and redundancy code of the data, candidate data formed after the flipping also includes data and redundancy code of the data. After obtaining the candidate data, the register controller 100 may perform error detection on the candidate data to determine whether an error occurs in the candidate data. Specifically, the register controller 100 may regenerate new redundancy code based on data in the candidate data, and determine whether an error occurs in the candidate data by comparing the new redundancy code with the redundancy code in the candidate data. If no error occurs, the candidate data is correct data. If an error occurs, the register controller 100 may flip data of some or all bits in the first failure location in the raw data once, to convert the raw data into another piece of candidate data, continue to perform error detection on the candidate data, and perform the foregoing operations circularly until candidate data in which no error occurs is determined.

It should be noted that, in practical application, after error detection is performed on the candidate data, if an error occurs in the candidate data, the register controller 100 may also perform error correction on the data in the candidate data by using redundancy code in the candidate data through the error correction algorithm. If the error correction of the candidate data succeeds, the corrected candidate data is correct data, and data flipping may be stopped. If error correction of the candidate data fails, data flipping may continue to be performed to obtain another piece of candidate data, and the foregoing operations are performed circularly until the correct data is obtained.

Manner 2: A UCE is converted into a CE by flipping, and then error correction is performed on the CE by using the error correction algorithm.

When the first failure location includes a large quantity of bits, a large quantity of candidate data is obtained in Manner 1, and error correction efficiency is reduced.

To further improve error correction efficiency, the register controller 100 may convert, in a data flipping manner, the UCE into the CE that occurs in a single memory die 210, and then perform error correction on the CE based on the error correction algorithm.

Specifically, the register controller 100 may flip only data that is in the first failure location in the raw data and that belongs to at least one bit of a target memory die, convert the raw data into one piece of candidate data (the candidate data is flipped raw data), and then perform error detection and error correction on the candidate data. The candidate data herein includes flipped data in the target memory die and raw data stored in a location other than the target memory die in the memory address.

The target memory die is one memory die 210 of a plurality of memory dice 210 or a plurality of memory dice 210 in which the UCE occurs. A manner of determining the target memory die is not limited herein. For example, the register controller 100 may use the memory die 210 whose quantity of bits distributed in each memory die 210 in the first failure location is smallest or whose quantity of bits is less than a threshold as the target memory die. For another example, the register controller 100 may alternatively randomly select a memory die 210 from the plurality of memory dice 210 as the target memory die.

A type of an error correction algorithm is not limited in embodiments of this application. For example, the error correction algorithm may be a cyclic redundancy check (CRC) algorithm, a parity algorithm, an RS16 algorithm, or an RS32 algorithm.

When a quantity of a plurality of memory dice 210 on which the UCE occurs is two, the register controller 100 may select one of the two memory dice 210 as a target memory die, then flip the data that is in the first failure location in the raw data and that belongs to the target memory die, and then perform error correction on the flipped raw data.

For a manner in which the register controller 100 flips the data that is in the first failure location in the raw data and that belongs to the target memory die, refer to the foregoing memory 200. A quantity of candidate data that can be obtained by the register controller 100 by flipping the data that is in the first failure location in the raw data and that belongs to the target memory die is related to a quantity of bits that belong to the target memory die in the first failure location. The register controller 100 may flip data that is in the first failure location in the raw data and that belongs to the target memory die once, to obtain one piece of candidate data, and then perform error detection on the candidate data. If no error occurs in the candidate data, the candidate data is correct data. If an error occurs in the candidate data, the register controller 100 may perform error correction on the candidate data. When error correction of the candidate data succeeds, the corrected candidate data is correct data. In this case, data flipping may be stopped. If error correction of the candidate data fails, data flipping may continue to be performed, and the foregoing operations are performed circularly until the correct data may be obtained. For a manner of performing error detection on the candidate data and error correction on the candidate data, refer to the foregoing description. Details are not described herein again.

When a quantity of a plurality of memory dice 210 on which the UCE occurs is P (P is a positive integer greater than two), the register controller 100 may select Q memory dice 210 (Q is a positive integer less than P) from the P memory dice 210 as target memory dice, then flip raw data that is in the first failure location and that belongs to the target memory dice, and then perform error correction on the flipped raw data. For a manner in which the register controller 100 flips the raw data that is in the first failure location and that belongs to the target memory die and an error correction manner, refer to the foregoing description. Details are not described herein again.

The first failure location may be positioned through step 303 to step 306, and error correction is performed on the raw data stored in the first failure location.

In practical application, the register controller 100 may perform step 303 to step 305 for a plurality of times. Each time step 303 to step 305 are performed, a first failure location may be determined, and whether the first failure location is accurate may be determined by comparing the first failure location determined each time.

For example, the register controller 100 performs step 303 to step 305 twice. When the register controller 100 performs step 303 to step 305 for the first time, a determined first failure location is a failure location 1. When the register controller 100 performs step 303 to step 305 for the second time, a determined first failure location is a failure location 2. The register controller 100 may determine whether the determined failure location is accurate by determining whether the failure location 1 is consistent with the failure location 2.

Usually, the first failure location determined each time step 303 to step 305 are performed is the same. However, in some scenarios, for example, in a process of reading or writing data, a data error occurs in the read or written data due to a change of the data caused by microscopic particles in the memory 200. The data error generated in this case, is referred to as a soft failure. To be specific, the soft failure is not a failure caused by hardware damage. The soft failure is random. To be specific, the soft failure does not occur every time of reading or writing data. When the soft failure occurs, the first failure location determined by the register controller 100 each time is different. For example, the failure location 1 and the failure location 2 differ by a location of one or more bits. The location of the one or more bits is a location in which the soft failure occurs.

Because the soft failure is characterized by being random, in a case in which the soft failure occurs in one or more bits, data error correction is more difficult, and the register controller 100 may not perform error correction on data in the one or more bits. In other words, the register controller 100 may use a first failure location that does not include a location in which the soft failure occurs in the first failure location that is determined each time as a final first failure location (to be specific, a first failure location excluding a bit in which the soft failure occurs), and perform step 306 based on the final first failure location. Definitely, the register controller 100 may use the first failure location that includes the location in which the soft failure occurs in the first failure location that is determined each time as the final first failure location (to be specific, the first failure location includes a bit in which the soft failure occurs and a bit in which a hard failure occurs), and perform step 306 based on the final first failure location. When there are many bits in which the soft failure occurs, the register controller 100 may alternatively skip performing step 306. When determining that the soft failure occurs in a few bits (for example, one bit), the register controller 100 may alternatively use the few bits as a part of the first failure location to perform step 306.

Because hardware in a location of a bit is damaged, data of the bit may be always 0 or always 1. For example, data of the bit is always 0. If data corresponding to the bit in the first data is 0, data of the second data read later in the bit may also be 0. As a result, the first failure location determined in step 305 does not include the bit. To be specific, the first failure location has an omission. To ensure that all failure locations can be positioned, the register controller 100 may alternatively continue to perform step 307 to step 310.

In practical application, the register controller 100 may alternatively not perform step 307 to step 310, to increase a speed of positioning a failure location and improve error correction efficiency of the UCE.

It should be noted that, if the first failure location determined by the register controller 100 by comparing the first data with the second data includes zero bits, to be specific, the first data is the same as the second data, the register controller 100 may continue to perform step 307 to step 310.

Step 307: The register controller 100 stores the flipped first data in the location indicated by the memory address.

Step 308: The register controller 100 reads third data from the location indicated by the memory address.

Step 309: The register controller 100 compares the flipped first data with the third data to determine a second failure location in the location.

The second failure location may include one or more bits. In a possible scenario, the second failure location may alternatively not include a bit. In other words, a failure bit is not positioned.

Step 310: The register controller 100 performs error correction on raw data stored in the second failure location.

A manner for steps 307 to 310 is similar to that for steps 303 to 306. For details, refer to the foregoing description. Details are not described herein again.

Figure 4:
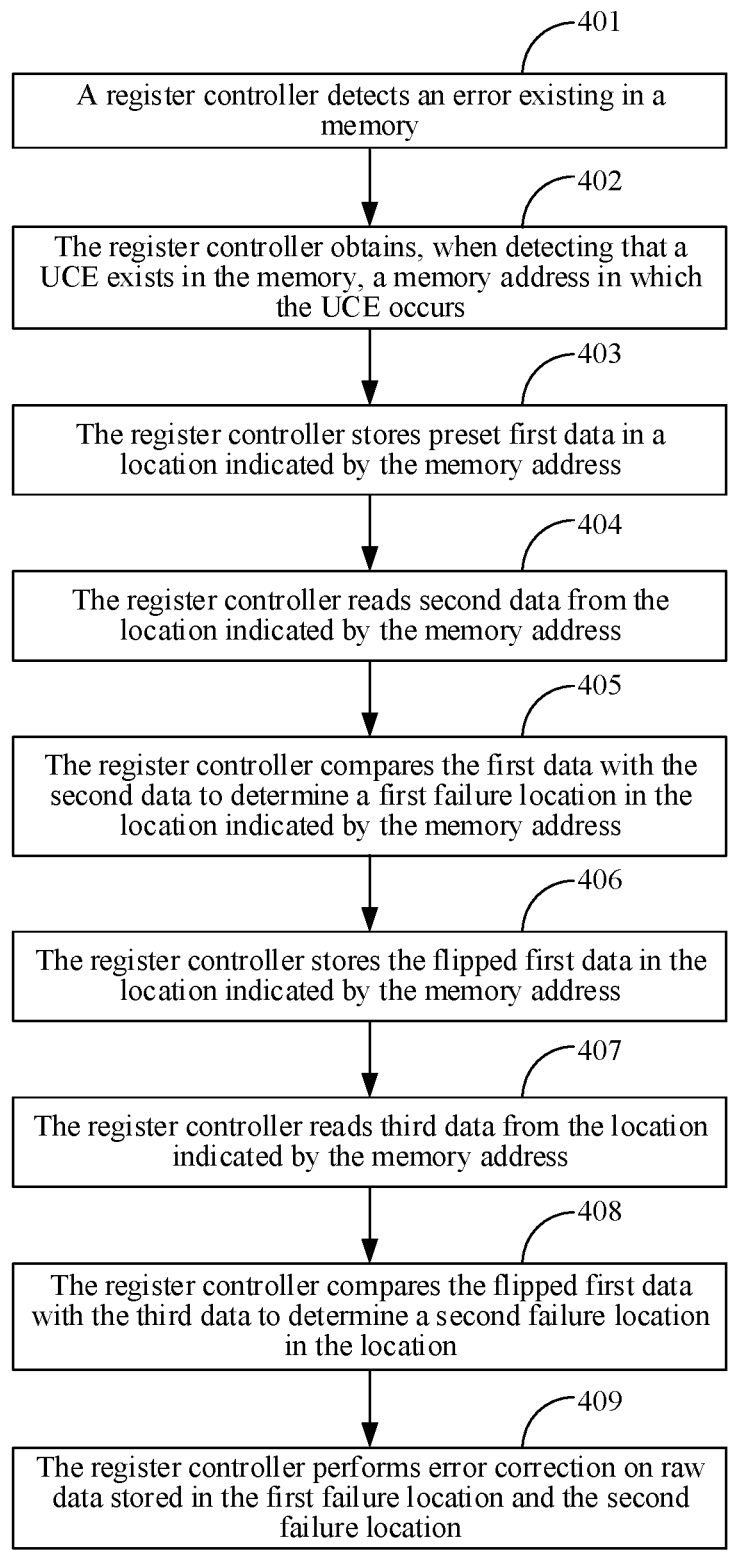
FIG. 4 is a schematic diagram of another error correction method according to this application.

In practical application, steps 307 to 310 and steps 303 to 306 may be combined. To be specific, the first failure location and the second failure location are first determined, and then error correction is performed on raw data stored in the first failure location and the second failure location. With reference to FIG. 4, an error correction method provided in an embodiment of this application is described below. Refer to FIG. 4. The method includes the following steps.

Step 401: A register controller 100 detects an error existing in a memory 200.

Step 402: The register controller 100 obtains, when detecting that a UCE exists in the memory 200, a memory address in which the UCE occurs.

Step 403: The register controller 100 stores preset first data in a location indicated by the memory address.

Step 404: The register controller 100 reads second data from the location indicated by the memory address.

Step 405: The register controller 100 compares the first data with the second data to determine a first failure location in the location. Herein, a quantity of bits included in the first failure location is not limited, and may be one or more. In a possible scenario, zero bits may alternatively be included. In other words, no failure bit is positioned.

The register controller 100 may perform step 403 to step 405 for a plurality of times to determine the first failure location for a plurality of times, and determine whether there is a bit in which a soft failure occurs; and may continue to perform the following steps if there is a bit in which a soft failure occurs or there is no bit in which a soft failure occurs; otherwise, stop.

Step 406: The register controller 100 stores the flipped first data in the location indicated by the memory address.

Step 407: The register controller 100 reads third data from the location indicated by the memory address.

Step 408: The register controller 100 compares the flipped first data with the third data to determine a second failure location in the location. Herein, a quantity of bits included in the second failure location is not limited, and may be one or more. In a possible scenario, zero bits may alternatively be included. In other words, no failure bit is positioned.

The register controller 100 may perform step 406 to step 408 for a plurality of times, determine a second failure location at a time, and determine whether there is a bit in which a soft failure occurs; and may continue to perform the following steps if there is a bit in which a soft failure occurs or there is no bit in which a soft failure occurs; otherwise, stop.

Step 409: The register controller 100 performs error correction on raw data stored in a failure location. The failure location includes the first failure location and the second failure location. A manner in which the register controller 100 performs error correction on the raw data stored in the failure location is similar to a manner in which the register controller 100 performs error correction on the raw data stored in the first failure location. For details, refer to the foregoing description. Details are not described herein again.

Figure 5:
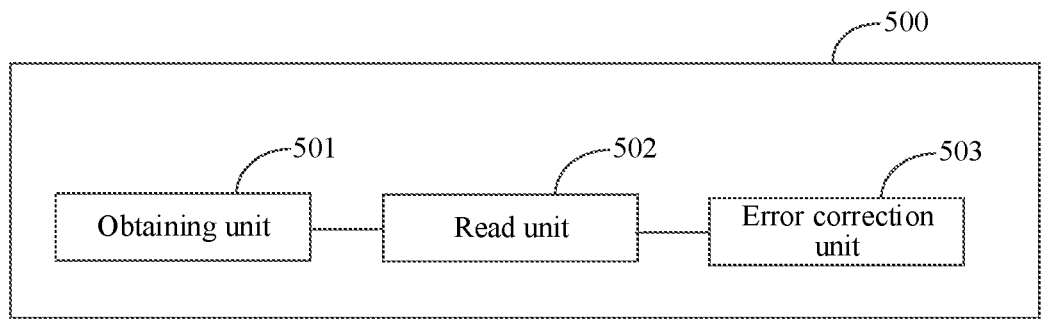
FIG. 5 is a schematic diagram of a structure of an error correction apparatus according to this application.

Based on a same inventive concept as the method embodiment, an embodiment of this application further provides an error correction apparatus, configured to perform the method performed by a register controller in the method embodiment shown in FIG. 3 or FIG. 4. For related features, refer to the method embodiment. Details are not described herein again. As shown in FIG. 5, the error correction apparatus 500 includes an obtaining unit 501, a read/write unit 502, and an error correction unit 503.

The obtaining unit 501 is configured to obtain, after detecting that an uncorrected error UCE exists in a memory, a memory address in which the UCE occurs.

The read/write unit 502 is configured to: store preset first data in a location indicated by the memory address, and read second data from the location.

The error correction unit 503 is configured to: compare the first data with the second data to determine a first failure location in the location, and perform error correction on raw data stored in the first failure location.

In a possible implementation, the read/write unit 502 may further flip the first data, then store the flipped first data in the location indicated by the memory address, and read third data from the location.

The error correction unit 503 may compare the flipped first data with the third data to determine a second failure location in the location, and perform error correction on raw data stored in the second failure location.

In a possible implementation, before storing the preset first data in the location indicated by the memory address, the read/write unit 502 may read raw data stored in the location and store the raw data. When performing error correction on the raw data stored in the failure location, the error correction unit 503 may flip data in at least one bit in the failure location in the raw data to obtain correct data; or may flip target data in the raw data, and then perform error correction on the flipped raw data, where the target data is data that is in the failure location and that is located in a target memory die, and the failure location includes the first failure location and the second failure location.

The error correction unit 503 may alternatively flip the raw data that is in the first failure location and that is located in at least one bit on the target die. Each time the raw data is flipped, the raw data in the location indicated by the memory address is converted into one piece of candidate data. The error correction unit 503 may perform error correction on the candidate data by using an error correction algorithm. If error correction of the candidate data succeeds, the data corrected by using the error correction algorithm is correct data; otherwise, the error correction unit continues to flip the raw data that is in the first failure location and that is located in at least one bit on the target memory die to obtain another piece of candidate data, and then performs error correction on the candidate data by using the error correction algorithm. The foregoing operations are performed circularly until correct data can be obtained by using the error correction algorithm.

In a possible implementation, when comparing the first data with the second data to determine the first failure location in the location, the error correction unit 503 may determine inconsistent first sub-data in the first data and the second data, where a location in which the first sub-data is stored is the first failure location.

In a possible implementation, when comparing the flipped first data with the third data to determine the second failure location in the location, the error correction unit 503 may determine inconsistent second sub-data in the flipped first data and the third data, where a location in which the second sub-data is stored is the second failure location.

In a possible implementation, when storing the preset first data in the location indicated by the memory address, the read/write unit 502 may directly store the first data in the location indicated by the memory address without generating redundancy code of the first data.

It should be noted that, in embodiments of this application, module division is an example, and is merely a logical function division. In actual implementation, another division manner may be used. Functional modules in embodiments of this application may be integrated into one processing module, or each of the modules may exist alone physically, or two or more modules may be integrated into one module. The integrated module may be implemented in a form of hardware, or may be implemented in a form of a software functional module.

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer program instructions. When the computer program instructions are loaded or executed on a computer, all or some of the procedures or functions according to embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

Figure 6:
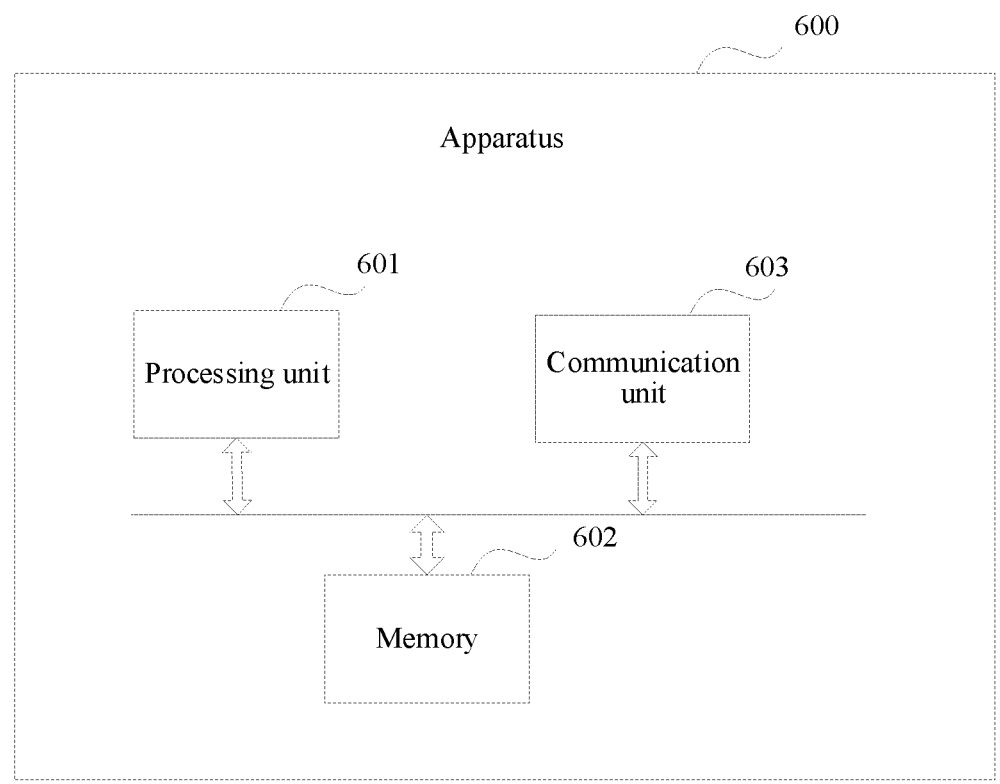
FIG. 6 is a schematic diagram of a structure of an apparatus according to this application.

In a simple embodiment, a person skilled in the art may figure out that a register controller in the embodiment shown in FIG. 3 or FIG. 4 may be in a form shown in FIG. 6.

An apparatus 600 shown in FIG. 6 includes at least one processing unit 601 and a memory 602, and optionally, may further include a communication unit 603.

The memory 602 may be a volatile memory such as a random access memory. Alternatively, the memory may be a non-volatile memory such as a read-only memory, a flash memory, a hard disk drive (HDD), or a solid-state drive (SSD). Alternatively, the memory 602 is any other medium that can be used to carry or store expected program code in a command or data structure form and that can be accessed by a computer. However, this is not limited. The memory 602 may be a combination of the foregoing memories.

In this embodiment of this application, a specific connection medium between the processing unit 601 and the memory 602 is not limited.

The processing unit 601 may be a general-purpose processing unit, a digital signal processor (DSP), an application-specific integrated circuit (ASIC), a field programmable gate array (FPGA) or another programmable logic device, a discrete gate or transistor logic device, a discrete hardware component, an artificial intelligence chip, a system on chip, or the like. The processing unit 601 may have a data receiving and sending function, and can communicate with another device. In the apparatus shown in FIG. 6, an independent data receiving and sending module, for example, the communication unit 603, may be disposed, and is configured to receive and send data. When communicating with another device, the processing unit 601 may perform data transmission through the communication unit 603, for example, transmit first data or flipped first data to a memory, and read raw data, second data, or third data from the memory.

When the register controller is in the form shown in FIG. 6, the processing unit 601 in FIG. 6 may call computer-executable instructions stored in the memory 602, so that the error correction apparatus can perform the method performed by the register controller in any one of the foregoing method embodiments.

Specifically, all functions/implementation processes of the obtaining unit, the read unit, and the error correction unit in FIG. 5 may be implemented by the processing unit 601 in FIG. 6 by calling the computer-executable instructions stored in the memory 602.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or another programmable device, so that computer-implemented processing is generated. Therefore, instructions executed on the computer or another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that these modifications and variations fall within the scope of protection defined by the following claims and equivalent technologies thereof.

What is claimed is:

1. An error correction method, wherein the error correction method comprises:
   detecting that an uncorrected error (UCE) exists in a memory;
   obtaining a memory address in which the UCE occurs;
   storing preset first data in a location indicated by the memory address;
   reading second data from the location;
   comparing the preset first data with the second data to determine a first failure location in the location;
   in response to determining that the first failure location comprises zero bits, flipping the preset first data;
   storing flipped first data in the location indicated by the memory address;
   reading third data from the location;
   comparing the flipped first data with the third data to determine a second failure location in the location;
   flipping target data in raw data stored in the second failure location to convert the UCE to corrected error (CE); and
   performing error correction on flipped target data.

2. The error correction method according to claim 1, wherein before the storing preset first data in a location indicated by the memory address, the error correction method further comprises:
   reading raw data stored in the location.

3. The error correction method according to claim 1, wherein the comparing the preset first data with the second data to determine a first failure location in the location comprises:
   determining inconsistent first sub-data in the preset first data and the second data, wherein a location in which the first sub-data is stored is the first failure location.

4. The error correction method according to claim 1, wherein the comparing the flipped first data with the third data to determine a second failure location in the location comprises:
   determining inconsistent second sub-data in the flipped first data and the third data, wherein a location in which the second sub-data is stored is the second failure location.

5. The error correction method according to claim 1, wherein the storing preset first data in a location indicated by the memory address comprises:
  directly storing the preset first data in the location indicated by the memory address without generating redundancy code of the preset first data.

6. The error correction method of claim 1, further comprising:
  reading data and a redundancy code of the data from the memory;
  calculating a new redundancy code of the data; and
  in response to determining that the new redundancy code is inconsistent with the redundancy code, determining that there is an error in the memory.

7. The error correction method of claim 6, further comprising:
  performing error correction on the data using an error correction algorithm; and
  in response to determining that an output result of the error algorithm indicates that error correction cannot be performed, determining that the error in the memory is a UCE.

8. An apparatus, wherein the apparatus comprises at least one processor and one or more memories, wherein the one or more memories are coupled to the at least one processor and store programming instructions for execution by the at least one processor to:
  detect that an uncorrected error (UCE) exists in a memory;
  obtain a memory address in which the UCE occurs;
  store preset first data in a location indicated by the memory address;
  read second data from the location;
  compare the preset first data with the second data to determine a first failure location in the location;
  in response to determining that the first failure location comprises zero bits, flip the preset first data;
  store flipped first data in the location indicated by the memory address;
  reading third data from the location;
  compare the flipped first data with the third data to determine a second failure location in the location;
  flip target data in raw data stored in the second failure location to convert the UCE to corrected error (CE); and
  perform error correction on flipped target data.

9. The apparatus of claim 8, wherein the one or more memories store the programming instructions for execution by the at least one processor to:
  read raw data stored in the location.

10. The apparatus of claim 8, wherein the one or more memories store the programming instructions for execution by the at least one processor to:
  determine inconsistent first sub-data in the preset first data and the second data, wherein a location in which the first sub-data is stored is the first failure location.

11. The apparatus of claim 8, wherein the one or more memories store the programming instructions for execution by the at least one processor to:
  determine inconsistent second sub-data in the flipped first data and the third data, wherein a location in which the second sub-data is stored is the second failure location.

12. The apparatus of claim 8, wherein the one or more memories store the programming instructions for execution by the at least one processor to:
  directly store the preset first data in the location indicated by the memory address without generating redundancy code of the first data.

13. The apparatus of claim 8, wherein the programming instructions are for execution by the at least one processor further to:
  read data and a redundancy code of the data from the memory;
  calculate a new redundancy code of the data; and
  in response to determining that the new redundancy code is inconsistent with the redundancy code, determine that there is an error in the memory.

14. The apparatus of claim 13, wherein the programming instructions are for execution by the at least one processor further to:
  perform error correction on the data using an error correction algorithm; and
  in response to determining that an output result of the error algorithm indicates that error correction cannot be performed, determine that the error in the memory is a UCE.

15. A non-transitory computer-readable storage medium, wherein the non-transitory computer-readable storage medium stores computer-executable instructions for execution by at least one processor to:
  detect that an uncorrected error (UCE) exists in a memory;
  obtain a memory address in which the UCE occurs;
  store preset first data in a location indicated by the memory address;
  read second data from the location;
  compare the preset first data with the second data to determine a first failure location in the location;
  in response to determining that the first failure location comprises zero bits, flip the preset first data;
  store flipped first data in the location indicated by the memory address;
  reading third data from the location;
  compare the flipped first data with the third data to determine a second failure location in the location;
  flip target data in raw data stored in the second failure location to convert the UCE to corrected error (CE); and
  perform error correction on flipped target data.

16. The non-transitory computer-readable storage medium of claim 15, wherein the non-transitory computer-readable storage medium stores the computer-executable instructions for execution by the at least one processor to:
  read raw data stored in the location.

17. The non-transitory computer-readable storage medium of claim 15, wherein the non-transitory computer-readable storage medium stores the computer-executable instructions for execution by the at least one processor to:
  determine inconsistent first sub-data in the preset first data and the second data, wherein a location in which the first sub-data is stored is the first failure location.

18. The non-transitory computer-readable storage medium of claim 15, wherein the non-transitory computer-readable storage medium stores the computer-executable instructions for execution by the at least one processor to:
  determine inconsistent second sub-data in the flipped first data and the third data, wherein a location in which the second sub-data is stored is the second failure location.

19. The non-transitory computer-readable storage medium of claim 15, wherein the non-transitory computer-readable storage medium stores the computer-executable instructions for execution by the at least one processor to:

directly store the preset first data in the location indicated by the memory address without generating redundancy code of the preset first data.

20. The non-transitory computer-readable storage medium of claim 15, wherein the computer-executable instructions are for execution by at least one processor further to:
- read data and a redundancy code of the data from the memory;
- calculate a new redundancy code of the data; and
- in response to determining that the new redundancy code is inconsistent with the redundancy code, determine that there is an error in the memory.

* * * * *